United States Patent [19]

Cappadona

[11] Patent Number: 5,461,664
[45] Date of Patent: Oct. 24, 1995

[54] EMERGENCY WIRELESS TELEPHONE

[76] Inventor: Steven Cappadona, 20 Tuella Ave., Elmwood, N.J. 07407

[21] Appl. No.: 43,862

[22] Filed: Apr. 7, 1993

[51] Int. Cl.$^6$ .................................................. H04Q 7/32
[52] U.S. Cl. .............................. 379/58; 379/37; 455/127
[58] Field of Search ........................... 379/37, 58, 59, 379/424–427, 433; 455/89, 90, 127; 439/426, 500

[56] References Cited

U.S. PATENT DOCUMENTS

| 4,237,344 | 12/1980 | Moore . | |
| 4,686,697 | 8/1987 | Shapiro et al. | 379/38 |
| 4,724,538 | 2/1988 | Farrell | 379/59 |
| 4,845,772 | 7/1989 | Metroka et al. | 379/433 |
| 5,148,470 | 9/1952 | Kobayashi et al. | 379/58 |
| 5,148,473 | 9/1992 | Freeland et al. | 379/59 |
| 5,159,317 | 10/1992 | Brav | 340/574 |
| 5,161,180 | 11/1992 | Chavous | 379/45 |
| 5,203,009 | 4/1993 | Bogusz et al. | 379/37 |

FOREIGN PATENT DOCUMENTS 0274128  11/1990  Japan ..................................... 455/127

Primary Examiner—Dwayne D. Bost
Attorney, Agent, or Firm—E. Vassiliou

[57] ABSTRACT

A portable telephone, which is used for emergency purposes. It is powered by a battery, which has a short life counterbalanced by higher power, thus improving efficiency and effectiveness of the emergency portable telephone. The battery may be sealed in a container for prolonging the life of the battery during the period of time that the telephone is inactive. In an emergency situation, the container may be pierced, and the battery freed to perform its duty.

14 Claims, 1 Drawing Sheet

EMERGENCY WIRELESS TELEPHONE

FIELD OF THE INVENTION

This invention relates to wireless telephones, and more particularly to battery operated portable emergency telephones.

BACKGROUND OF THE INVENTION

This invention relates to wireless telephones, and more particularly battery operated portable emergency telephones.

Wireless telephones, also named cellular telephones due to the system used for their operation, may be classified in three major categories; mobile, transportable, and portable. All these types of telephones contain a transmitter and a receiver, the combination of the two commonly being called a transceiver. Of course, in order to operate, they need a power source, which usually comes in the form of a rechargeable battery.

The mobile telephones are mostly installed in automobiles or other vehicles, and they are considerably more powerful than the rest, because they are powered by the battery of the vehicle, which for all practical purposes provides an unlimited power source as far as the needs of the mobile telephone are concerned. They are usually permanently installed in the vehicle, and they have antennas, which are mostly mounted outside the vehicle, but sometimes they may also be mounted inside. There is no doubt then that they fulfil their purpose of providing good communications from a vehicle to the outside world, but they cannot provide the same type of communications to a person away from the vehicle.

The transportable telephones have their own battery, which is rather powerful, and since they are not permanently installed in the vehicle, they may be used inside the vehicle in a similar manner as the mobile phones, or they may also be used outside the vehicle. Due to the rather high weight of the battery, however, which is in the vicinity of 4–6 pounds, they are mainly used as telephones which may be in more than one cars, or when not in use, they may be stored out of sight, in the trunk of the car, to decrease the probability of somebody attempting to break into the car for stealing the telephone.

The portable telephones use a much smaller rechargeable battery within the handset, and an antenna on the handset, thus resembling very much the handset of a common cordless telephone. They may be carried in the pocket of a person, but they are more expensive than the other two types since they have the most stringent power requirements, due to the small size of the battery.

The above types of wireless telephones are a small part of a very complicated cellular network, which combines an elaborate relay of towers, as well as interconnected wireless and regular phone lines. This renders the cellular service very expensive and often inadequate. The operation of cellular networks is very well known to the artisans.

Despite the apparent popularity of cellular phones, there is a large portion of population, who would like to have a less expensive and more powerful means of communications, just for emergency situations. Many people, indeed, buy the full service of a cellular carrier, and attempt to use it for emergency purposes only, in order to pay only the service fee, even though the service fee itself is very steep. Others, cannot afford it at all, with catastrophic results, because of lack of communications in an emergency situation, in a remote place, for example.

First of all, the emergency telephone should have to be light and portable, so that it could be carried by the owner in his or her pocket or purse without a problem. This type of telephone, however, happens to be the most expensive one. In addition to this, the small batteries of portable phones for regular and conventional use, may happen to go low and render the portable phone insufficient in power just the time the emergency may occur, and the phone is needed the most. One of the reasons that this is very probable is that the regular portable phones are usually maintained at a stand-by status, which consumes power of the battery. Furthermore, the owner of the phone, like a holder of a credit card, does not resist to use it, even for nonemergency situations. Even worse, the cellular phone owner pays as much for a call that he or she answers for air-time as for one he or she makes, while the caller, calling from a traditional telephone pays the nominal non-cellular charge; and all this is added to the monthly service charge, which is non-affordable to many people, as aforementioned.

Therefore, there is a strong need for an inexpensive system, affordable for a higher portion of the population, which system is also much more effective and efficient. Although a number of attempts have been made in the past to create communications systems for cases of emergency situations, none of them resolves the problems recognized and resolved by the instant invention.

U.S. Pat. No. 4,237,344 (Moore) discloses a system for rapid response communications system in order to provide reliable health care services for patients located within or outside a health care facility. Furthermore, an out-of-hospital communications network using auto-dialing telephones is provided to allow outpatients to communicate from outside the facility with the health care coordinator to assist the outpatients in rapidly and efficiently receiving appropriate advice and health care as indicated by the by the patient medical profile and for responding to emergency situations.

U.S. Pat. No. 4,686,697 (Shapiro et al.) discloses a telephone care system, which has a line-checking arrangement connected to a line seizing arrangement and an off-hook detector so as to activate the line seizing arrangement and send a bad line signal in the event that the off the hook detector does not provide an off-hook signal when the line has been seized. A preferred embodiment also utilizes the off-hook detector for the additional purpose of resetting an inactivity timer, which, on expiration of a predetermined interval of time, triggers an alarm call over the telephone wires.

U.S. Pat. No. 4,724,538 (Farrell) discloses a roadside emergency system, which includes a roadside station which has a telephone unit similar to a mobile telephone set for a cellular mobil telephone system. When the unit is activated, it automatically generates radio signals which cause a mobile telephone switching office to dial up an emergency station, such as a highway police station. The office also automatically establishes a channel for voice communication between the roadside station and the emergency station. The roadside station is further provided with a back-up battery and an alarm to prevent tampering.

U.S. Pat. No. 5,148,470 (Kobayashi et al) discloses a radio telephone apparatus including a base unit connected to a wire line and a radio telephone unit connected to the base unit via a radio communication link. The apparatus has an instantaneous conversation function for establishing a conversation state by detecting that the radio telephone unit has been lifted up in a standby state, and also has a talk commencing/terminating key allowing a command for commencing a conversation and a commend for terminating the conversation to be imputed alternately. A time guard controlling circuit is also provided for invalidating an input operation of the talk commencing/terminating key if the talk commencing/terminating key is operated during a period set time. Simultaneously as the conversation state is established by lifting the radio telephone unit in the standby state, the preset timer is started, and even if the talk commencing/ terminating key is pressed during the preset time of the timer, the input operation is invalidated and the conversation state is maintained.

U.S. Pat. No. 5,148,473 (Freeland et al.) discloses a pager and a radio-telephone apparatus having a radio pager section and a cellular radiotelephone section into one unit. This apparatus may automatically receive a plurality of pages while the cellular radiotelephone section is on, communicating a cellular telephone call, or off and unattended. The received pages are stored in the pager section until the apparatus user acknowledges their receipt by a key-stroke. The pages are then transferred to the radiotelephone section and stored in a non-volatile memory for later use.

U.S. Pat. No. 5,159,317 (Brav) discloses a home communicator, which includes aid request circuitry capable of establishing communications with a central monitoring station in response to a first predetermined activation step performed by a subscriber and test circuitry capable of self-testing the home communicator in response to a second predetermined activation step formed by the subscriber. The home communicator further includes enable/disable circuitry capable of transmitting an identification number to a central monitoring station in response to a third predetermined activation step with the aid request circuitry and the test circuitry being unresponsive prior to the functioning of the enable/disable circuitry.

U.S. Pat. No. 5,161,180 (Chavous) discloses a device for responsively providing, in cooperative association with the 911 emergency system, the number and location of a telephone, especially a Private Branch Exchange (PBX) extension telephone, from which such a 911 call originates. A first device is installed between PBX's and the extensions thereof, with the number and location of each extension stored in the device's electronic memory. A second such device is installed at a Public Safety Answering Point (PASP). When 911 is dialed from an extension telephone of a PBX equipped with a device of Chavous' invention, even if the extension receiver is still on hook, the extension is connected over telephone lines to the second device installed at the PASP. The device at the PASP then interrogates the device at the PBX which responsively transmits the location of the extension telephone from which the call originated. The device installed at the PASP relays the location information to at least one computer which informs an operator of the location of the calling phone. The PASP operator is then able to dispatch assistance to the person placing the emergency call. Provision is made for automatically selecting an alternate route if no interrogating signal is detected.

SUMMARY OF THE INVENTION

The instant invention is directed to an emergency portable telephone, comprising
 a transceiver,
 a first switch having an on-position and an off-position, the first switch connected to the transceiver in a manner to be capable to activate the transceiver when the first switch is in the on-position and deactivate the transceiver when the first switch is in the off-position, the normal status of the first switch being in the off position, resulting in preventing the telephone from receiving phone calls;
 a battery connected with the transceiver through said first switch, the battery being adaptable to power the transceiver when the first switch is in the on position, the life of the battery being adequate to last for a predetermined duration of emergency phone calls made within a predetermined period of time, after the first switch has been turned to the on-position; and
 a timer activated by the first switch for interrupting the power of the battery from the transceiver at said predetermined period of time.

Preferably, the battery is in a sealed form from the atmosphere, so that the useful life of the battery is considerably prolonged for the period of time the telephone is not in use, and the portable telephone further comprises means for freeing the battery from the sealed form.

The present invention is also directed to an emergency portable telephone, comprising
 a transceiver,
 a first switch having an on-position and an off-position, the first switch connected to the transceiver in a manner to be capable to activate the transceiver when the first switch is in the on-position and deactivate the transceiver when the first switch is in the off-position, the normal status of the first switch being in the off position, resulting in preventing the telephone from receiving phone calls; and
 a battery in a sealed form from the atmosphere, the battery being connected with the transceiver through said first switch, the battery being adaptable to power the transceiver when the first switch is in the on position;
 means for freeing the battery from its sealed form and electrically connecting the first switch with the battery so that when the first switch is turned on, the battery powers the transceiver.

In other preferred embodiments of the invention
 the means for freeing the battery are part of the first switch;
 the means for freeing the battery involve a piercing mechanism; and
 the telephone further comprises a closure containing the first switch, which closure has to be withdrawn before the first switch becomes operable.

DESCRIPTION OF THE DRAWINGS

The reader's understanding of the present invention will be enhanced by reference to the following detailed description taken in conjunction with the drawing figures, wherein.

DETAILED DESCRIPTION OF THE INVENTION

This invention relates to wireless telephones, and more particularly to battery operated portable emergency telephones.

As aforementioned, wireless telephones, also named cellular telephones due to the system used for their operation, may be classified in three major categories; mobile, transportable, and portable. All these types of telephones contain a transmitter and a receiver, the combination of the two commonly being called a transceiver. Of course, in order to operate, they need a power source, which usually comes in the form of a rechargeable battery.

Due to the small size and convenience of carrying in one's pocket or purse, the portable cellular telephones, as earlier indicated, are the most suitable for one to have and use in emergency situations. However, due to a plurality of reasons, already discussed, even the portable telephones cannot effectively and efficiently fulfill the purpose of being used as communications means in the case of an emergency.

Some important parameters and factors favoring the transformation of a general purpose portable telephone to an emergency portable telephone, according to this invention, are those of (a) minimizing the size of the portable telephone by minimizing the size of the battery, without sacrificing the power that the battery may provide to the transmitter, (b) maximizing the distance that the telephone may communicate with, and (c) maximizing the time that the battery may stay in the portable telephone without the battery having to be changed or recharged.

In addition to the above, since the emergency phone does not have to be assigned a particular number for outsiders to call in, and since there is no regular use of the phone, it may be arranged with the carrier company not to charge monthly service fees, but charge a somewhat higher fee when an emergency phone call is made. An individual, at the same time, would be willing to pay even a considerably steeper fee to the cellular carrier company for this emergency phone call.

These and other advantages are realized from the teachings of the present invention.

Figure 1:
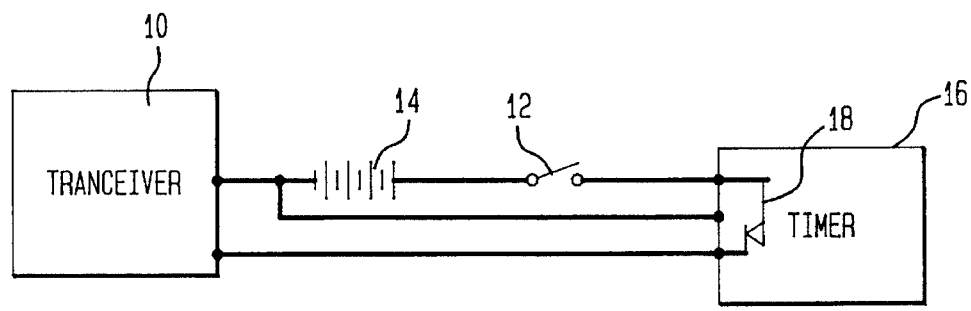
FIG. 1 is a schematic diagram showing a transceiver connected to a battery, a first switch and a timer contained in an emergency portable telephone according to a preferred embodiment of the present invention.

Referring now to FIG. 1, there is depicted a transceiver 10 according to the present invention, which is part of a portable telephone, the totality of which is not shown for purposes of clarity, but which is very well known to a person of ordinary skill in the art. The transceiver 10 is connected to a first switch 12, having an on-position and an off-position. In FIG. 1, the first switch 12 is shown in the off-position. As it can be seen in the diagram of FIG. 1, the first switch 12 may activate the transceiver 10 when it is in the on-position, and de-activate the transceiver 10 when it is in the off position. The normal status of the first switch 12 is to be in the off-position (normally open), so that the transceiver cannot receive any phone calls from the outside.

There is also shown a battery 14, which is in a series configuration or connection with the first switch 12 and the transceiver 10. The battery 14 is adaptable to activate or power the transceiver 10, when the first switch 12 is in the on-position. The life of the battery 14 is adequate to activate the transceiver 10 with high enough power to reach even remote cellular towers, when compared to general-use portable phones. This is because the whole life of the battery 14 is substantially devoted to nothing else but the operation of the telephone during the emergency call period. Since the goal in this case is to use the telephone at the most for only a small number of relatively short emergency calls, the duration of the life of the battery may be sacrificed for power. It is very well known to a person of ordinary skill in the art that a battery, storing a given amount of energy, may be arranged to release it fast (high power) or slowly (low power). Thus, the fact that the power is inversely proportional to the life of a battery for a constant amount of energy stored in the battery, is utilized according to this invention, to achieve a portable emergency telephone of high efficiency and effectiveness for its purpose.

It is preferable that the life of the is between 3 and 10 minutes, and more preferable between 4 an 7 minutes, giving preferably a power of not less than 2 watts. The battery may be in a package form of one piece, or a combination of cells may be used in series or in parallel or a combination of both in order to achieve the desired characteristics of life and power of the battery 10. The battery may be rechargeable or usable once only.

There is also provided a timer 16, which interrupts the power of the battery to the transmitter at a predetermined period of time after the first switch 12 has been turned on. This period of time is preferably in the range of 10 to 60 minutes, and more preferably in the range of 25 to 35 minutes. The timer is powered by the battery. In order to draw the least amount of power it is preferably a solid state timer, very well known to the art. This timer is used as a further deterrent for the owner of the phone to use it in a non-emergency situation. The timer 16 is preferably located inside the telephohe casing (not shown), so that the casing has to be removed for resetting the timer, which makes the resetting operation cumbersome, and therefore a deterrent. The timer, may also be such that only a qualified technician, or even the cellular carrier company may only reset, rendering this process a considerably stronger deterrent for the person to use the telephone in other than real emergency situations. The cellular carrier company, for example, might use a combination of a microswitching mechanism (not shown) on the relay to reset the relay, which combination only the carrier company knows. Such microswitching mechanisms are very well known to the art.

The timer should preferably be of a latching type, so that after the aforementioned predetermined period of time it latches a second switch 18 open (being normally closed), which interrupts the electrical continuity of the battery with the transceiver, even when the first switch 12 is in the on-position, and without needing further power to maintain said second switch 18 open. Electrical circuitry of this type is common knowledge to a person of ordinary skill in the art, and needs no further explanation.

It should be noted that when the timer 16 is reset, the battery 14 should also be either changed or re-charged, depending on its type.

As aforementioned, FIG. 1 does not show the handset and casing of the handset of the portable emergency telephone, for purposes of clarity, and because they also are common knowledge to a person of ordinary skill in the art, and therefore need no particular explanations, as far as the present invention is concerned.

In operation, the first switch 12 is in the off-position (open), and the second switch 18 of the timer 16 is in the on-position (closed). Under these circumstances, the transceiver 10 remains idle (not powered). In case of an emergency, the operator turns the first switch 12 in the on-position which gives power to the transceiver, and simultaneously starts the timer 16. In sequence, the operator dials the number he or she wants to notify regarding the emergency, and then he or she turns the first switch 12 in the off-position. The operator may repeatedly turn the first switch 12 in the on-position for making additional emergency phone calls, as long as the total time that the transmitter is powered by the battery does not exceed the life of the battery, and as long as the additional calls are made before the timer 16 interrupts the power from the battery to the transceiver. It should be noted that additional openings or closings of first switch 12 have no influence on the timer 16. Suppose for example, for purposes of illustration only, that the life of the battery 10 is 10 minutes, and that the timer 16 is set to open the circuit in 30 minutes through the second switch 18. The operator has only 30 minutes to make one or more emergency phone calls, after he turns for the first time the switch 12 in the on-position, as long as all phone calls together do not last more than 10 minutes.

After the emergency phone calls have been made, and the emergency has passed, the operator changes or recharges the battery 14, and causes the resetting of the timer 16, by himself or herself or a third party.

Figure 2:
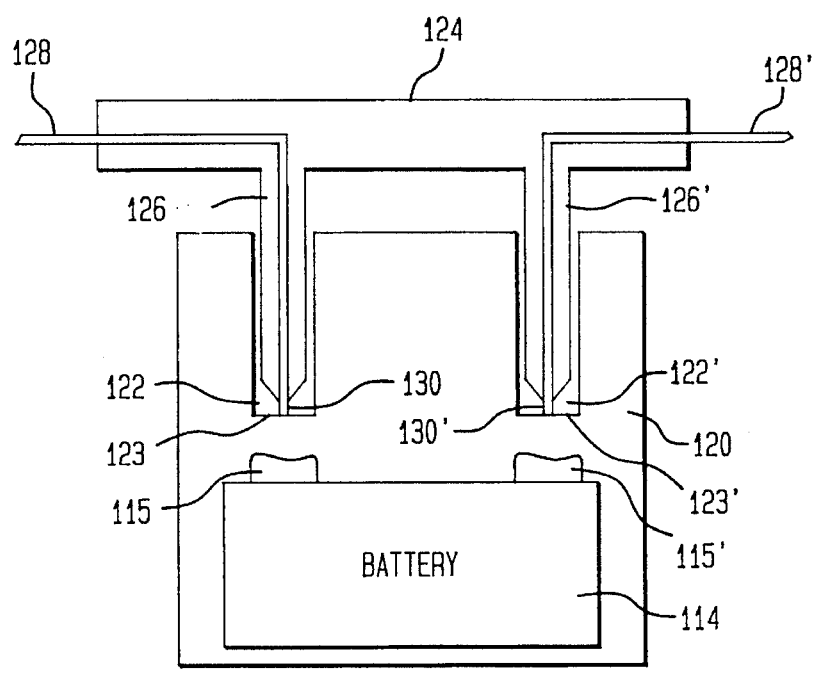
FIG. 2 illustrates schematically a battery sealed from the atmosphere, and piercing means for freeing the battery according to another embodiment of the present invention.

In a different embodiment of this invention, the battery is sealed from the atmosphere, so that its duration, even in humid environments is increased considerably. One example, of such an arrangement is illustrated in FIG. 2. The battery 114 is sealed in a box 120, which is substantially impervious to gases, and especially moisture. Packaging materials of this sort are very well known to the art, and they usually include laminates, preferably comprising a metal layer, such as aluminum, for example. The battery 114 is secured at the bottom of the box 120, and has poles 115 and 115'. The box 120 has two cavities 122 and 122', preferably having a cylindrical shape, and bottoms 123 and 123', respectively, located over the poles 115 and 115', respectively. On top of the box 120, there is positioned a plunger 124, made out of electrically insulating material, which has two plugs 126 and 126', snugly fitting in the cavities 122 and 122', respectively. The plugs 126 and 126', surround conductors 128, and 128', respectively, which have piercing ends 130 and 130', respectively. In this embodiment the conductors 128 and 128' are connected in a manner to substitute the battery 14 of FIG. 1.

The operation of this embodiment is similar to the operation of the previous embodiment, except that before the operator turns the first switch 12 (FIG. 1) to the on-position, the operator pushes the plunger 124 toward the battery 114, in a manner that the piercing ends 130 and 130' pierce the bottoms 123 and 123' respectively, and connect the conductors 128, and 128' with the poles 115 and 115, respectively. The plunger 124 is an example of means for freeing the battery 114 from the sealed form. From this point on, the un-sealed battery arrangement of FIG. 2 operates exactly as the battery 14 of FIG. 1, for the purposes of this invention. The snuggle fitting of the plugs 126 and 126' in the cavities 122 and 122' respectively holds the ends 130 and 130' in good contact with the poles 115 and 115' respectively, after the piercing operation. Also, the poles 130 and 130' may be spring loaded for better contact. Care should be taken to ensure that in case the packaging material is a laminate containing a layer of metal, the layer of metal does not short-circuit the battery. This is easy to avoid by keeping the distance of the bottoms 123 and 123' from the poles 115 and 115' long, and the exposed surfaces of the ends 130 and 130' small.

In another embodiment, only one pole of the battery may be sealed, the operation being substantially the same as above.

In a different embodiment, the plunger 124 may be part of the first switch 12 of FIG. 1. For example, the switch 12 may be absent altogether, and replaced by a continuity conductor. Then the plunger 124 may play the role of the switch.

Figure 3:
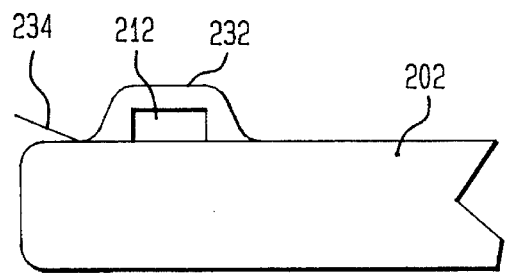
FIG. 3 is a fractional view of an emergency portable telephone, wherein the on-off first switch is covered by a seal according to a different embodiment of the instant invention.

In still another embodiment, offering a further deterrent, so that the portable telephone is used only in cases of emergency, is illustrated in FIG. 3. The first switch 212 extending away from casing 202 of the emergency portable telephone of this invention, is covered by a sealing cap 232, having a flap 234. In the operation of this embodiment the operator has to remove the sealing cap 232 by pulling the flap 234, in order to be able to turn the switch 212 in the on position, and make an emergency call. The rest of the operation is the same as described above.

Examples demonstrating the operation of the instant invention have been given for illustration purposes only, and should not be construed as restricting the scope or limits of this invention in any way.

In the various embodiments illustrated in FIGS. 1 to 3, numerals differing by multiples of 100 represent the same or similar elements performing the same or similar functions, according to the present invention.

What is claimed is:

1. An emergency portable telephone, comprising:

a transceiver;

a switch having an on-position and an off-position, the switch is connected to the transceiver in a manner which activates the transceiver when the switch is in the on-position and deactivates the transceiver when the switch is in the off-position, the normal status of the switch being in the off position, resulting in preventing the telephone from receiving phone calls;

a battery connected with the transceiver through said switch, the battery supplies power to the transceiver when the switch is in the on position, the life of the battery being limited to last for a predetermined duration of emergency phone calls made within a predetermined period of time, after the switch has been turned to the on-position; and a timer activated by a first occurence of the switch being set in the on-position for interrupting power supplied to the transceiver at the conclusion of said predetermined period of time; wherein subsequent openings or closings of the switch has no influence on interrupting the activated timer.

2. The portable telephone of claim 1, further comprising a box, in which the battery is enclosed in a sealed form in order to be protected from the atmosphere, so that the useful life of the battery is considerably prolonged for as long as the telephone is inactive.

3. The portable telephone of claim 2, further comprising means for piercing the box.

4. The portable telephone of claim 1, wherein the telephone further comprises a closure containing the switch, which closure has to be withdrawn before the switch becomes operable.

5. The portable telephone of claim 1, wherein the life of the battery is between 3 and 10 minutes.

6. The portable telephone of claim 5, wherein the life of the battery is between 4 and 7 minutes.

7. The portable telephone of claim 5, wherein the power given by the battery is not less than 2 watts.

8. The portable telephone of claim 1, further comprising a box, in which the battery is enclosed in a sealed form in order to be protected from the atmosphere, so that the useful life of the battery is considerably prolonged for as long as the telephone is inactive.

9. The portable telephone of claim 8, further comprising means for piercing the box.

10. The portable telephone of claim 9, wherein the means for piercing the box are part of the switch.

11. An emergency portable telephone, comprising: a switch having an on-position and an off-position, the switch is connected to the transceiver in a manner activates the transceiver when the switch is in the on-position and deactivates the transceiver when the switch is in the off-position, the normal status of the switch being in the off position, resulting in preventing the telephone from receiving phone calls;

a box;

a battery disposed in the box in a sealed form from the atmosphere; and piercing means for piercing the box and establishing contact between the switch and the battery, so that when the switch is turned on, the battery powers the transceiver;

the piercing means being part of the switch.

12. The portable telephone of claim 11, wherein the telephone further comprises a closure containing the switch, which closure has to be withdrawn before the switch becomes operable.

13. An emergency portable telephone, comprising:

a transceiver, a switch having an on-position and an off-position, the switch is connected to the transceiver in a manner activates the transceiver when the switch is in the on-position and deactivates the transceiver when the first switch is in the off-position, the normal status of the switch being in the off position, resulting in preventing the telephone from receiving phone calls;

a battery connected with the transceiver through said switch, the battery supplies power to the transceiver when the switch is in the on position, the life of the battery being limited to last for a predetermined duration of emergency phone calls made within a predetermined period of time, after the switch has been turned to the on-position;

a timer activated by the switch for interrupting power supplied from the battery to the transceiver at said predetermined period of time;

a box, in which the battery is enclosed in a sealed form in order to be protected from the atmosphere, so that the useful life of the battery is considerably prolonged for as long as the telephone is inactive; and means for piercing the box and establishing electrical contact between the battery and the switch, the piercing means being part of the switch.

14. An emergency portable telephone as defined in claim 13, wherein the timer interrupts the electrical continuity of the battery with the transceiver after the predetermined period of time, even when the switch is in the on-position.

* * * * *